US006892890B2

(12) United States Patent
Dominguez

(10) Patent No.: US 6,892,890 B2
(45) Date of Patent: May 17, 2005

(54) DYNAMIC SORTATION OF ITEMS IN A CONTAINERIZATION SYSTEM

(75) Inventor: Gilbert Dominguez, Mukwonago, WI (US)

(73) Assignee: ABB Automation, Inc., New Berlin, WI (US)

( * ) Notice: Subject to any disclaimer, the term of this patent is extended or adjusted under 35 U.S.C. 154(b) by 486 days.

(21) Appl. No.: 09/760,958

(22) Filed: Jan. 16, 2001

(65) Prior Publication Data

US 2002/0092801 A1 Jul. 18, 2002

(51) Int. Cl.[7] .......................... G06K 9/00; B07C 5/00
(52) U.S. Cl. .......................... 209/559; 209/583
(58) Field of Search .......................... 209/559, 563, 209/564, 583, 584, 900, 933; 414/268; 700/224, 226

(56) References Cited

U.S. PATENT DOCUMENTS 3,864,559 A * 2/1975 Mori et al. ................. 700/224
4,507,739 A * 3/1985 Haruki et al. ............... 700/224
4,520,447 A * 5/1985 Nara .......................... 700/224
4,601,396 A * 7/1986 Pavie ......................... 209/569
4,692,876 A 9/1987 Tenma et al.
4,936,735 A 6/1990 Ryan
4,976,584 A 12/1990 Focke
5,100,284 A 3/1992 Boisseau
5,287,271 A * 2/1994 Rosenbaum ................... 705/8
5,348,440 A 9/1994 Focke
5,363,310 A * 11/1994 Haj-Ali-Ahmadi et al. . 700/216
5,993,132 A 11/1999 Harres et al.
6,026,967 A 2/2000 Isaacs et al.
6,055,462 A 4/2000 Sato
6,076,683 A * 6/2000 Okada et al. ........... 209/583 X
6,192,288 B1 * 2/2001 Yamaoka .................... 700/116
6,201,203 B1 * 3/2001 Tilles ..................... 209/933 X
6,227,378 B1 * 5/2001 Jones et al. ............. 209/584 X
6,259,964 B1 * 7/2001 Robinson .................... 700/224
6,522,943 B2 * 2/2003 Dierauer ..................... 700/223
6,647,316 B2 * 11/2003 Bahri et al. ................. 700/217
6,665,586 B1 * 12/2003 Ball et al. .................... 700/226
6,741,908 B2 * 5/2004 Vanderbles et al. ......... 700/224

* cited by examiner

*Primary Examiner*—Donald P. Walsh
*Assistant Examiner*—Joseph C Rodriguez
(74) *Attorney, Agent, or Firm*—Michael Best & Friedrich LLP

(57) ABSTRACT

A dynamic sortation system and method. The invention is preferably utilized in a robotic containerization system having a number of locations for containers such as carts or pallets. Each location may be assigned a speed of loading rating that represents the time needed for a robot to load an item to a location. The system may be preprogrammed with a simplified, base scheme of destinations. After these initial steps, the system reads destination codes from each of the plurality of items in a load of items sent to the system for sortation. The system may store the destination code of each read item in a historical database. The system then determines whether the read destination code is assigned a location. If the destination code is assigned a location, the item is loaded in a container at the assigned location. If the destination code is not assigned a location, the system determines whether to assign the destination code a location based on whether the destination code is in the scheme of destinations, the projected or historical number of items having the same destination code, and the speed of loading rating for each location.

8 Claims, 6 Drawing Sheets

DYNAMIC SORTATION OF ITEMS IN A CONTAINERIZATION SYSTEM

RELATED APPLICATIONS

This application is a related to application Ser. No. 09/521,989 filed on Mar. 9, 2000, the entire contents of which are hereby incorporated by reference herein. Application Ser. No. 09/521,989 claims the benefit of provisional application No. 60/124,427 filed on Mar. 15, 1999.

FIELD OF THE INVENTION

The present invention relates to systems and devices used to load containers and pallets. More particularly, the present invention relates to a robotic system used to load mail trays and tubs of different shapes and sizes on pallets and into wheeled containers and carts.

BACKGROUND OF THE INVENTION

Bulk items such as mail and packages and even component parts must be sorted in order to deliver those items to desired locations. In the case of mail, zip codes and other codes are used to sort letters and parcels. Generally, the sorting process involves placing mail with the same or related codes into tubs or trays. The tubs and trays are then placed on pallets and carts and the pallets and carts are loaded on trucks or other vehicles for shipment to their appropriate destinations.

Some parts of this process have been automated, including the sorting of mail by zip code. However, the loading of tubs and trays onto pallets and carts (generically and collectively referred to as "containers") is generally done by hand. While hand or manual loading accomplishes the desired result, it requires postal staff to be engaged in physically demanding and tedious work. Moreover, the speed at which pallets and the number of people that can be economically employed to carry out the task. Due to the limitations of present systems, automated loading or containerization systems have been developed. While these systems eliminate the problems associated with manually loading containers, these systems are not as efficient as desired. In particular, automated containerization systems generally load items according to a static sortation scheme. The sortation scheme provides instructions to the system regarding, among other possible information, the location of containers into which items are to be placed. However, static schemes are unable to respond to changes in the volume and destinations of the items being containerized.

SUMMARY OF THE INVENTION

Accordingly, the present invention provides an automated system for loading pallets and containers with mail trays, tubs, and other items that dynamically responds to changes in the volume and destination of those items. The present invention may be implemented in a system that in one embodiment includes two cells, each with a gantry robot, although the invention can be implemented with one cell. Each cell includes an open frame that is secured to a hard surface such as the concrete floor of a building. The sides of the frame may be enclosed with a mesh. A number of doors are provided in the mesh walls to provide access to the interior of the cell. The top of the cell is open and includes two tracks on which the robot travels. The robot is mounted on the cell such that it can move in a horizontal plane along two axes. A conveyor system for moving items passes through the cells.

The robot includes a robot arm that is extendible in a vertical plane that is perpendicular to the plane in which the robot moves. A mechanical wrist is coupled to the end of the robot arm and an end effector or gripper is mounted on the wrist. The robot grasps the items from the conveyor system and delivers them to containers.

The cells include a number of locations and each location defines a position for a container. A location may correspond to one or more physical bays in a cell. For example, a cart may fit within one bay while a pallet may require two bays. Each location has a speed of loading rating that represents the time required for the robot to move an item from the position where the item is picked from the conveyor system to the location of the container. In some instances the load rating may be a scaled, relative measurement value such as 1–100 or it may be an actual value such as the number of items moved per minute.

The containerization system is controlled by a control system. The control system includes a sort scheme module that includes a database of the physical layout of the cell, which represents the number and type of containers the cell is configured to hold and the destination assignments or scheme destinations for the locations of the cell. The sort scheme module communicates with a controller. The controller receives data from the conveyor system and or item reader. The item reader reads destination codes from the items sorted by the system.

The sort scheme module determines whether a read destination code is assigned a location in the cell. If the destination code is assigned a location, the item is loaded by the robot in a container assigned to that location. If the destination code is not assigned a location, the sort scheme module determines whether to assign the destination code a location based on whether the destination code is in the scheme of destinations, the projected or historical number of items having the same destination code, and the speed of loading rating for each location.

The invention includes a method of sorting a plurality of items by destination. The method includes defining a number of locations, where each location represents a position for a container. The method also includes assigning each location a speed of loading rating, creating a scheme of destinations, reading a destination code from each of a plurality of items, and determining whether the destination code is assigned a location. If the destination code is assigned a location, the item is loaded in a container at the assigned location. If the destination code is not assigned a location, the method involves determining whether to assign the destination code a location based on whether the destination code is in the scheme of destinations, the projected or historical number of items having the same destination code, and the speed of loading rating for each location.

These are just some of the features and advantages of the present invention. Others will become apparent by a review of the drawings and details described below.

DETAILED DESCRIPTION

Figure 1:
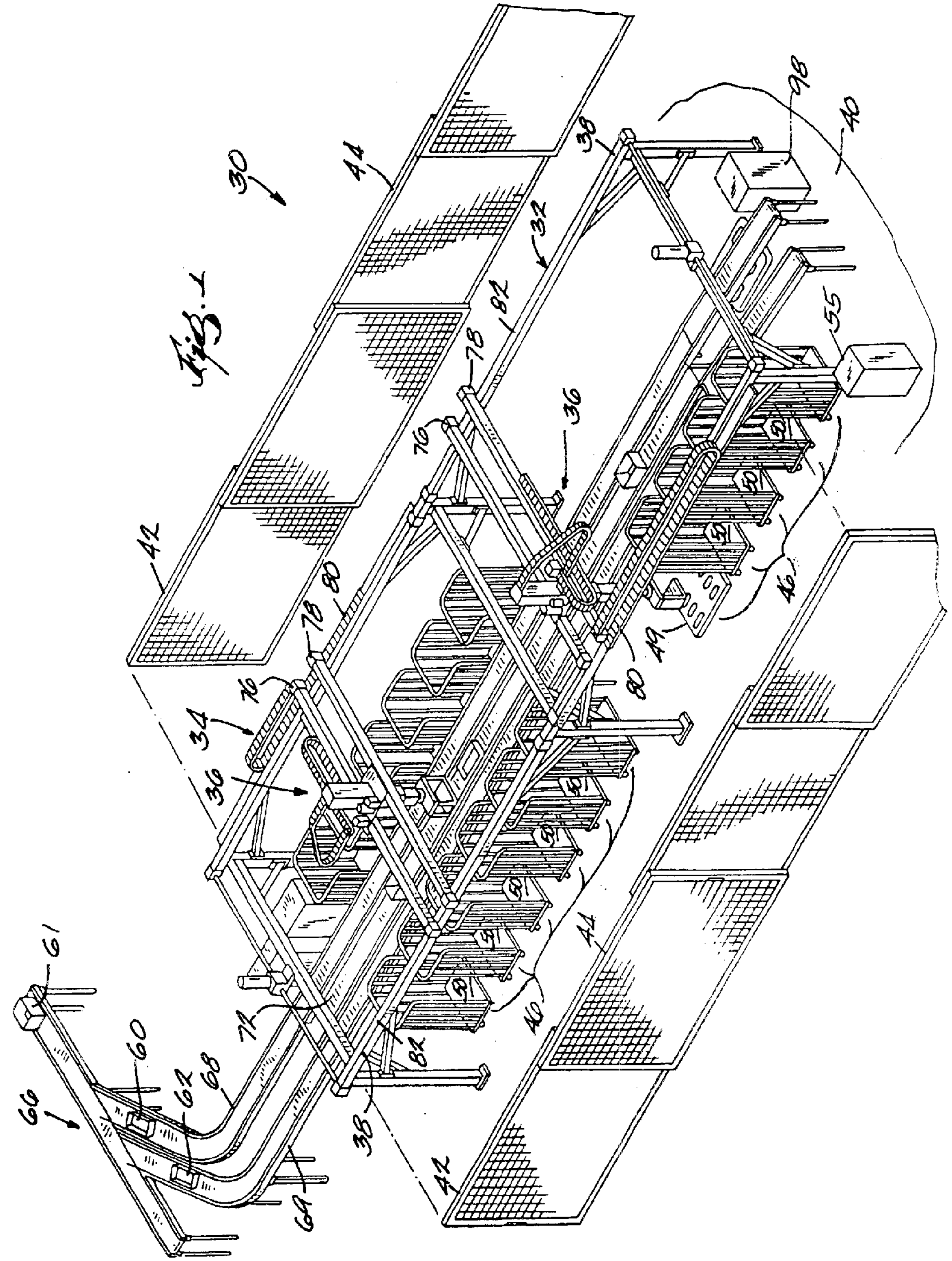
FIG. 1 is a partially exploded, perspective view of the system of the invention.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Figure 2:
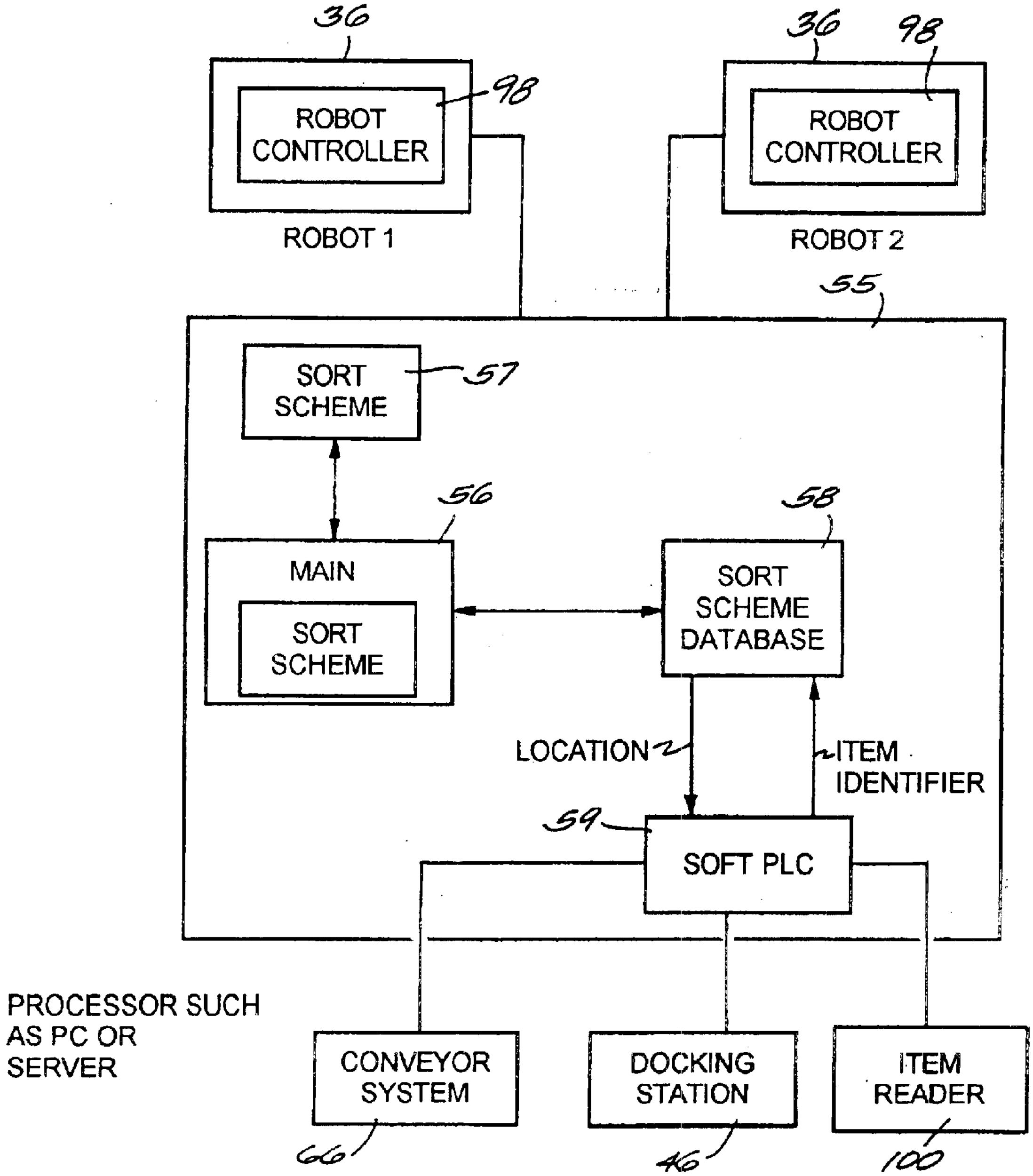
FIG. 2 is a schematic diagram, illustrating the architecture of the control system used in the invention.

A containerization and palletizing system 30 is shown in FIG. 1. The system 30 includes two cells 32 and 34 each equipped with a gantry or overhead-type robot 36. Although not shown, the invention may be implemented with just one cell and one robot as well as other types of robots. Each cell 32, 34 has a frame 38 which may be secured to a hard surface such as a concrete floor 40. The space between the frame members may be enclosed with a perimeter fence 42, a mesh, a similar material, or even other types of walls. One or more gates or doors 44 may be provided to permit access to the interior of the cell. Each cell 32, 34 has a plurality of locations or bays 46 for pallets 49 and carts 50. Sensors (not shown) sense the presence or absence of pallets 49 and carts 50 (generically referred to as "containers") in a bay and that information is communicated to a system controller 55. The system controller 55 includes a sort scheme module 56 (FIG. 2). The sort scheme module 56 can accept a sort scheme 57 as input or generate the presently programmed sort scheme as output in the form of a printed form or an image on a display (not shown). The system controller 55 also includes a database module 58 that includes a database of destination assignments for the system. The database module 58 also receives destination codes or, more broadly, item identifiers as read by item reader (discussed below) through a controller interface 59. The controller interface 59 may be a software-based programmable logic controller. The controller interface 59 receives input position data from a conveyor system (discussed below) and container present information from the docking stations or bays 46 in the system 30. Container identifying information is read and supplied to the database module 58. Location information, such as destination assignments for containers in the bays 46, is transferred from the database module to the robot controllers (discussed below) and the controller interface 59.

Figure 6:
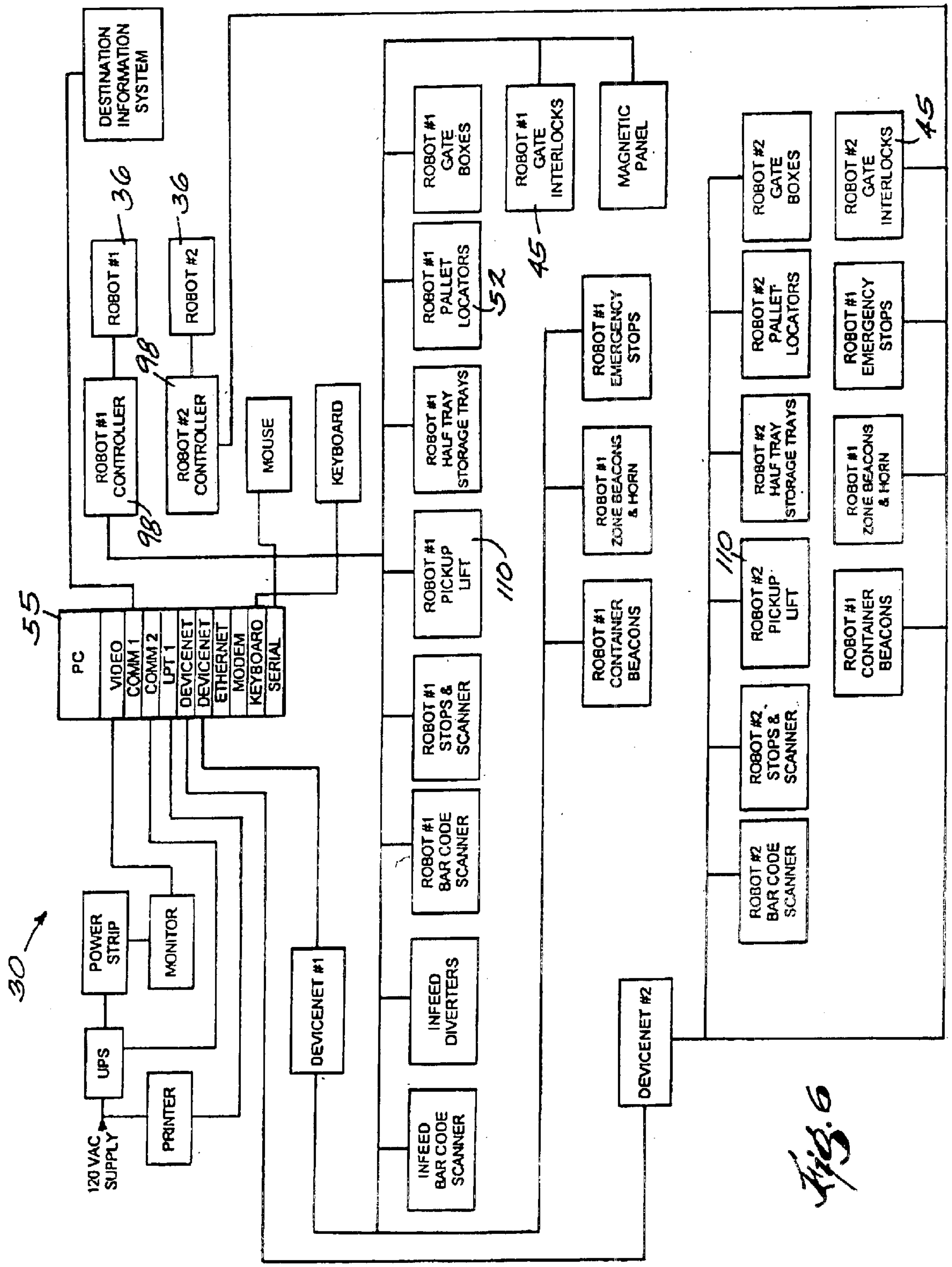
FIG. 6 is a schematic of the communication and control system of the invention.

Pallets and carts may be moved into and out of the cells 32 and 34 through the access gates or doors 44. Gate interlocks 45 (FIG. 6) sense whether the doors 44 are open and lock the doors in place when they are closed. As discussed below, upon receipt of an appropriate command signal, the interlocks may be released to permit the doors 44 to be opened by technicians operating the system. Automated guided vehicles ("AGV's") may be used to place and remove pallets and carts. Destination information transferred to the docking station system may be used by the AGV's to determine where to move loaded carts and pallets.

Figure 3:
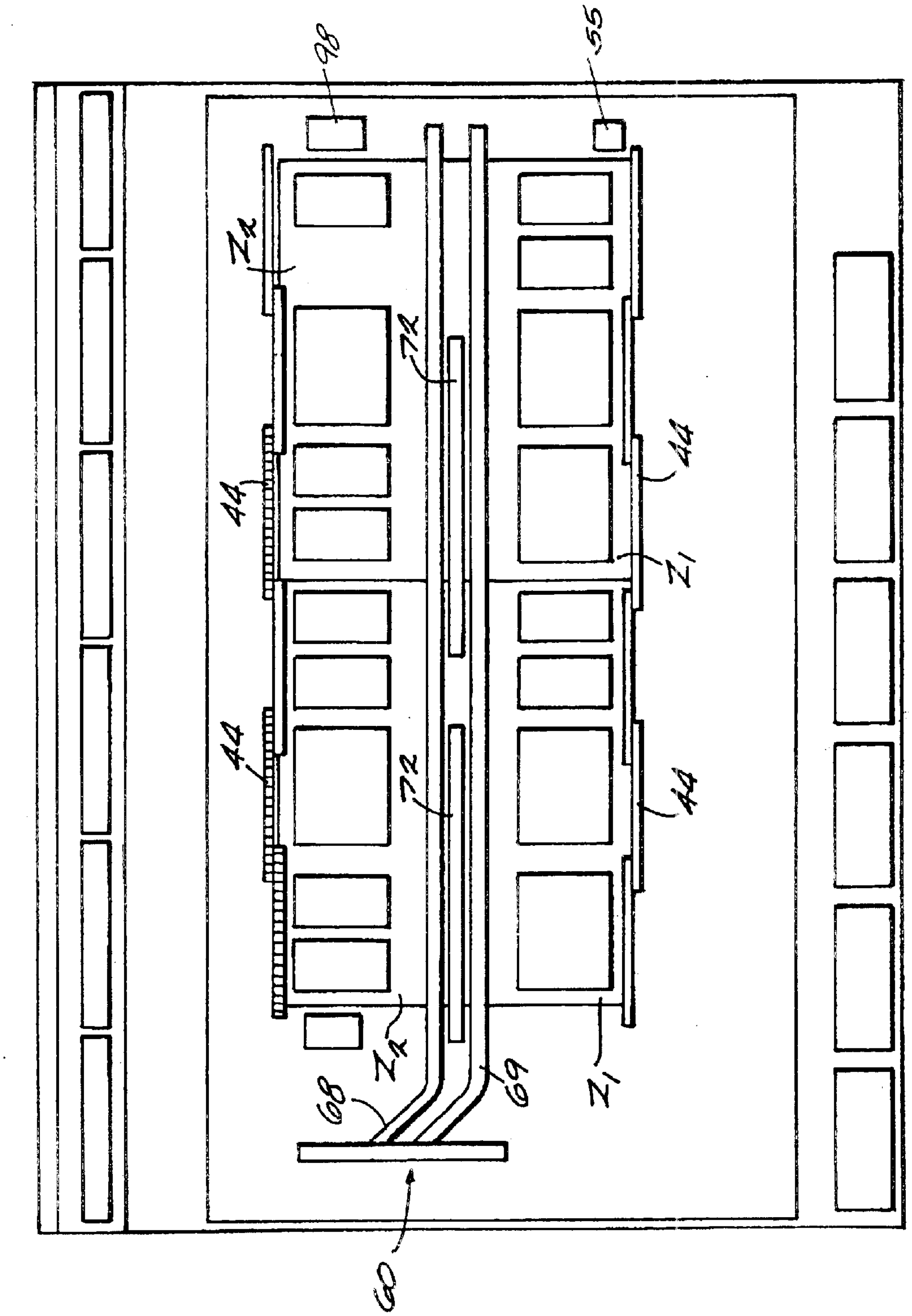
FIG. 3 is a schematic representation of the system of the invention as might be presented on a display device used by a system operator.
Figure 4:
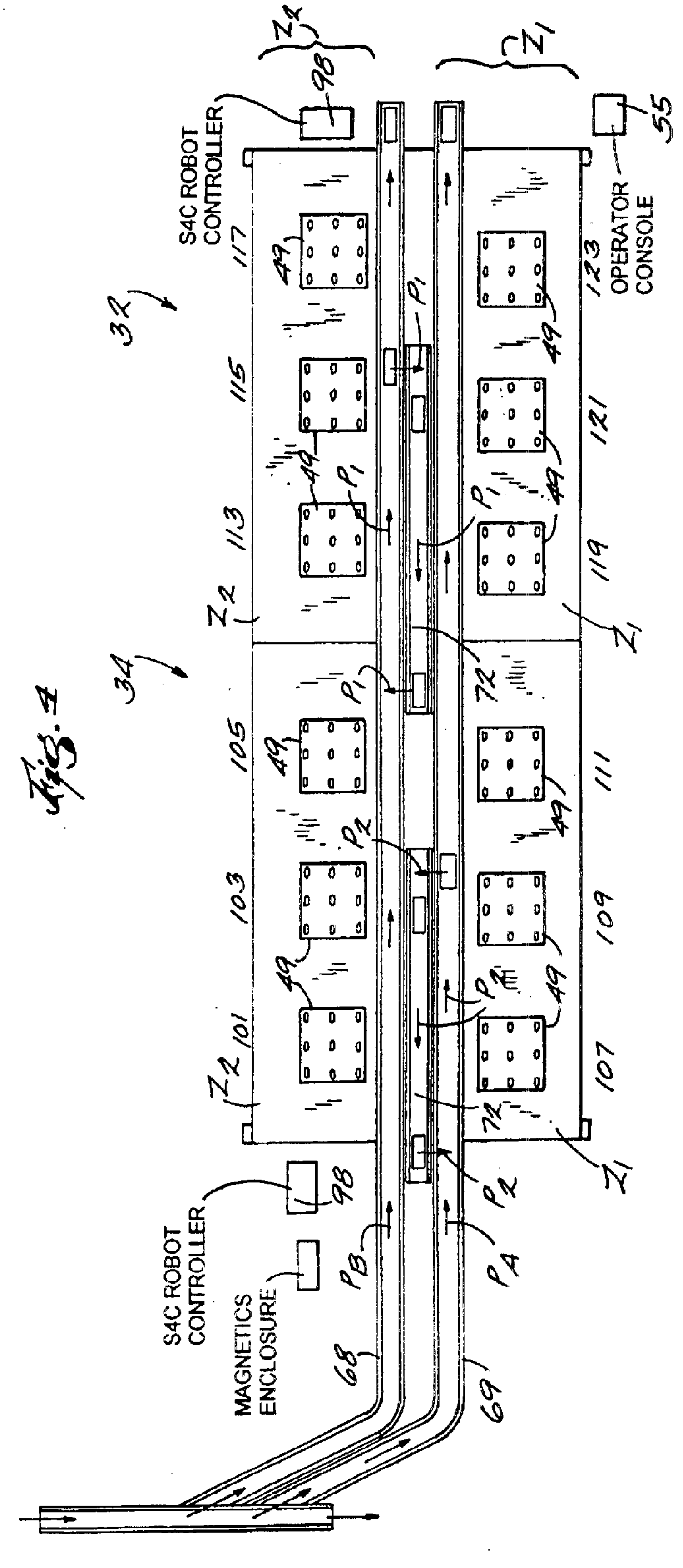
FIG. 4 is a schematic, top view of the system of the invention configured to load pallets.
Figure 5:
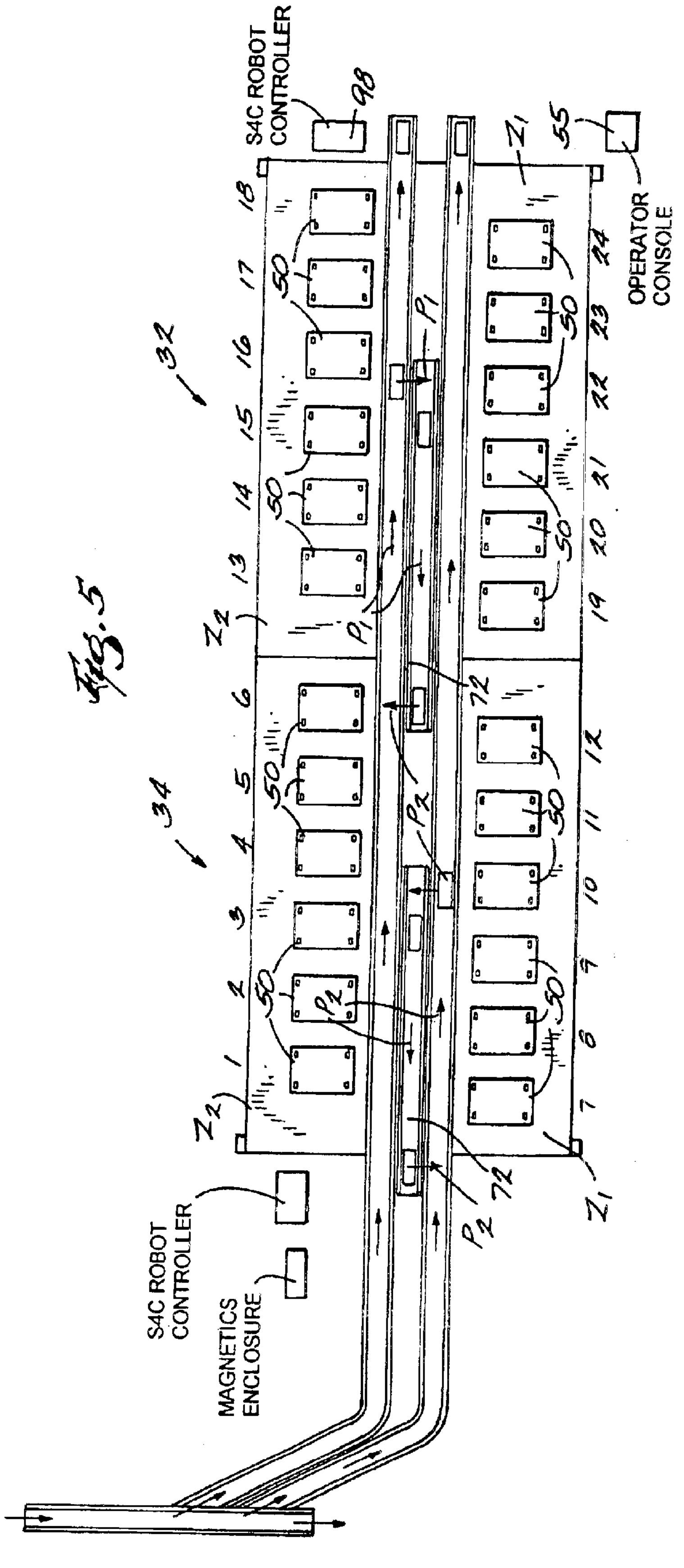
FIG. 5 is a schematic, top view of the system of the invention configured to load carts.

In the embodiment described herein, each cell 32, 34 is divided into two zones $Z_1$ and $Z_2$ (FIGS. 3, 4, and 5) and each door 44 provides access to a zone. For the embodiment shown in FIG. 4, the cell 32 is divided into zone $Z_1$ with locations 119, 121, and 123 and zone $Z_2$ with locations 113, 115, and 117. Cell 34 is divided into zone $Z_1$ with locations 107, 109, and 111 and zone $Z_2$ with locations 101, 103, and 105. The embodiment shown in FIG. 5 is similarly configured. Cell 32 of FIG. 5 has zones $Z_1$ and $Z_2$ and locations 13–24. Cell 34 of FIG. 5 has zones $Z_1$ and $Z_2$ and locations 1–12.

The division of cells into locations (also referred to as bays) provides an exact place or site for each location and the container associated with that location. These positions are used by the controller to instruct the robot where to move when putting a tray in a container.

Mail trays 60, tubs 61 and similar cartons, and other items (which from time-to-time are referred to generically as "trays" or "items") are brought into the cells 32 and 34 along paths $P_A$ and $P_B$ by a conveyor system 66. In the embodiment shown, two parallel conveyors 68 and 69 are positioned to move items from one end of the cells to the other. As best seen by reference to FIGS. 4 and 5, within each cell is a conveyor 72 which runs in a direction such that packages may be moved in circular paths $P_1$ and $P_2$. A plurality of sensors (not shown) is positioned along the conveyors in order to detect the location and presence of trays on the conveyors 68, 69, and 72. Information from the sensors is communicated to the system controller 55.

In the embodiment shown, the robot 36 in each cell 32, 34 is mounted on a plurality of beams 76 and 78 spanning the cell from side to side, perpendicular to the robot's long axis. The beams 76 and 78, in turn, are mounted on powered and guiding tracks 80 and 82, respectively, at the top of the cell, parallel to the long axis of the cell. The robot is movable along the beams 76 and 78 and the beams are movable on the tracks 80 and 82. The tracks 80 and 82 are positioned parallel to the floor under the cell. So mounted, each robot is movable along X and Y axes in a substantially horizontal plane.

Each robot 36 is controlled by its own robot control system 98 (FIGS. 1–6) which includes software that controls the movement of each robot within each cell. The robot control system 98 interfaces with the system controller 55 (that, as described above, controls the conveyors running through the cells and senses the presence or absence of carts and pallets). The system controller 55 sends commands to the robot depending on the status of the system 30. Of course, it should be understood that while two separate control systems 55 and 98 are described herein, a single control system (not shown) combining the functions of the robot and system controllers could be implemented.

One type of robot controller suitable for use in the present invention is an S4C robot controller available through ABB Flexible Automation, Inc. The S4C robot controller may be loaded with software (described more fully below) that is designed to carry out the desired operations of the controller. When an S4C robot controller is used, the system controller may be implemented using a midrange computer or even a personal computer. Like the robot controller, the system controller is loaded with software designed to carry out the desired operations of the system.

In operation, items are placed on the conveyors 68 and 69. The conveyors bring the items into the cells. While an item travels on the conveyors 68 or 69, the destination code on the item is read by an item reader 100. Once inside the cells, the items are directed to the central conveyor 72 to a desired location or pick-up point. The presence of an item at the pick-up point is sensed by a sensor and the sensor sends an item or part present signal to the system controller, which in response to receiving that signal turns off the conveyor. The system controller also informs the robot that an item is located at the pick-up point. The item is then lifted vertically from the conveyor surface by a pick-up lift 110 (shown schematically in FIG. 6) allowing the robot's gripper to engage the item. The robot then moves to the item, grasps it, and moves it to a container within the cell.

The process involved and operation of the system to pick up an item from the conveyor system is described in detail in U.S. application Ser. No. 09/521,989, the disclosure of which is hereby incorporated by reference. Accordingly, the focus of the description that follows will be on dynamic sortation of items.

As noted above, each item includes an identifier or destination code. The code may be stored in an RF identification tag, take the form of a bar code, or be some other identifying device that provides information for sorting items. In the embodiment disclosed, the destination code may include a ZIP code, a content information number or CIN code, a day of delivery or DOD code, and or an automation identification number or (AIN) code.

Each location can be assigned a destination. In a static sorting system the assignments are made before the system begins sorting items and remain unchanged while sorting occurs. The locations are assigned destinations dynamically in the method and system of the invention. Each destination represents a real world locale. ZIP, CIN, DOD, and AIN codes or combinations thereof can be used to create individual destinations. The basic operating principle of the system 30 is that all items having the ZIP, CIN, DOD, and/or AIN codes specified in a destination are sorted into the container assigned to the location having that same destination assignment. However, in the present invention the assignment of destinations to locations is made dynamically based on changes or variations in the volume and destinations of the items delivered to the system 30 by conveyors 68 and 69.

Although assigning destinations to locations is done dynamically, some set or plurality of locations within a cell is defined before sorting begins. Generally, the determination or defining of the locations will be based on a human or machine estimate as to the number and types of locations (i.e., cart or pallet) that will be needed to handle a load of items sent to the system 30. In the system 30 each location may be assigned a speed of loading which represents the time needed for the robot 36 to move from the pick-up point to the location. While it is possible to configure a cell such that the distance from the pick-up point to a location is equidistant, as would be the case with a circular cell with a central pick-up point, in most instances, a cell will have a rectangular configuration, meaning that the distances to locations will vary. Thus, the time to load items to any particular location will also vary. In the present invention, this variation is exploited by assigning locations with high speed of loading ratings to destinations to which a large number of items are addressed. Locations with low speed of loading ratings can be assigned destinations to which a small or lesser number of items are addressed. Speed of loading ratings may be absolute, i.e., based on empirical evidence of the number of items that may be loaded to a location in a predetermined amount of time or based on a relative scale, such as from 1 to 100.

Once the locations are defined and speed of loading ratings assigned, a base scheme of destinations may be created. The scheme may assign destinations to all of the locations, but preferably the scheme only assigns destinations to a relatively few number of the available locations and the assignments that are made are for destinations that a large number of items are expected to be assigned.

As items are read by the item reader 100, the destination of each item is stored in memory by the sort scheme module 56 in order to create a history of the items being sorted. The historical information can be used to predict the destinations of future items to be sorted. Thus, when large numbers of items having the same destination are being sorted by the system, an assumption can be made that items having that same address will continue flowing to the system. That assumption may be overridden by empirical evidence that destinations for items are changing or becoming variable. In addition to projections based on historical data, other projections may be made using other algorithms.

Once the destination code from an item is read, the sort scheme module 56 determines whether the read destination code is assigned a location in the system 30. If the destination code has already been assigned a destination code, then the item is loaded in the container at the assigned location. If the destination code is not assigned a location, the sort scheme module 56 determines whether to assign the destination code a location based on whether the destination code is in the scheme of destinations, the projected or historical number of items having the same destination code, and the speed of loading rating of each location.

If a determination is made not to assign a read destination code to a location the item may be recirculated by directing it to paths $P_1$ or $P_2$. The item may be kept in the recirculation path until additional items having the same destination code are read. When a predetermined number of items having the same destination are read, then the system may assign a location that destination and load those items in a container at the location. Alternatively, when a determination is made not to assign a read destination code a location, items may be rejected, by removing them from the conveyor system using, for example, an automated kick plate to push the items to a rejection bin.

In addition to the criteria noted above, the determination to assign a destination code a location can be made based on a predetermined set of restrictions. The restrictions could include, for example, black-out destinations, type of container, type of item, black-out or availability of work zones, a limit on the number of locations to be assigned to any one destination, forecast information from upstream equipment via the network, the locations of high volume items for the purpose of exchanging a full cart while switching to another location without stopping the system, etc.

Many possible forms of the invention may be constructed based on the teachings set forth herein. Therefore, while the present invention has been described in reference to particular embodiments and examples, it should be understood that the invention is not confined to the particular construction and arrangement of the components illustrated and described, but embraces all forms encompassed by the following claims.

What is claimed is:

1. A method of sorting a plurality of items by destination, the method comprising:

defining a number of locations, where each location is a position for a container;

assigning each location a speed of loading rating;

creating a scheme of destinations;

reading a destination code from each of the plurality of items;

determining whether the destination code from one of the plurality of items is assigned a location;

if the destination code is assigned a location, loading the one of the plurality of items in a container at the assigned location;

if the destination code is not assigned a location, determining whether to assign the unassigned destination code a location based on whether the unassigned destination code is in the scheme of destinations, a projected or historical number of items having a same destination, and the speed of loading rating for each location.

2. A method as claimed in claim 1, further comprising:

recirculating an item when a determination is made not to assign the unassigned destination code a location.

3. A method as claimed in claim 1, further comprising:

rejecting an item when a determination is made not to assign the unassigned destination code a location.

4. A method as claimed in claim 1, wherein determining whether to assign the unassigned destination code is further based on reviewing a set of restrictions.

5. A method as claimed in claim 4, wherein the set of restrictions includes a type of container in which items are loaded.

6. A method as claimed in claim 4, wherein the set of restrictions includes a work zone in which containers for items are located.

7. A method as claimed in claim 4, wherein the set of restrictions includes a limit on the number of locations to be assigned to any one destination.

8. A method as claimed in claim 2, further comprising tracking an amount of items in recirculation.

* * * * *